(12) United States Patent
Hicks

(10) Patent No.: US 11,349,813 B2
(45) Date of Patent: May 31, 2022

(54) PREEMPTIVE DETERMINATION OF RESERVED IP CONFLICTS ON VPNS

(71) Applicant: INTERNATIONAL BUSINESS MACHINES CORPORATION, Armonk, NY (US)

(72) Inventor: Lester R. Hicks, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/864,624

(22) Filed: May 1, 2020

(65) Prior Publication Data

US 2020/0259796 A1    Aug. 13, 2020

Related U.S. Application Data

(63) Continuation of application No. 15/827,066, filed on Nov. 30, 2017, now Pat. No. 10,681,011.

(51) Int. Cl.
*H04L 29/06* (2006.01)
*H04L 29/12* (2006.01)
*H04L 12/46* (2006.01)

(52) U.S. Cl.
CPC ...... *H04L 63/0272* (2013.01); *H04L 61/2535* (2013.01); *H04L 63/164* (2013.01); *H04L 12/4641* (2013.01); *H04L 61/2007* (2013.01); *H04L 61/2038* (2013.01); *H04L 61/2592* (2013.01)

(58) Field of Classification Search
CPC ............. H04L 63/0272; H04L 61/2007; H04L 61/2592; H04L 61/2038; H04L 61/2061; H04L 61/2015; H04L 29/06; H04L 29/08; H04L 29/08072; H04L 29/08099; H04L 43/08; H04L 43/0806; H04L 43/0873; H04L 43/12
See application file for complete search history.

(56) References Cited

U.S. PATENT DOCUMENTS

| | | | |
|---|---|---|---|
| 8,631,050 B1 | 1/2014 | Gayle | |
| 8,812,633 B2 | 8/2014 | Viger et al. | |
| 9,548,904 B2 | 1/2017 | Voltmer et al. | |
| 2006/0206934 A1 | 9/2006 | Ammirata | |
| 2007/0061887 A1* | 3/2007 | Hoover | H04L 63/10 726/26 |

(Continued)

OTHER PUBLICATIONS

IBM, "IBM QRadar Vulnerability Manager," https://www.ibm.com/us-en/marketplace/ibm-qradar-vulnerability-manager, Printed on Jul. 12, 2017, pp. 1-1.

(Continued)

*Primary Examiner* — Shaqueal D Wade-Wright
(74) *Attorney, Agent, or Firm* — Anthony M. Pallone

(57) ABSTRACT

Passive determination of reserved internet protocol (IP) conflicts on one or more hosted virtual private networks (VPNs) extracts configuration information for a plurality of hosting VPNs to build an aggregated list of IP addresses with mask and associated VPN information. A route table is extracted from a router directing traffic to an appropriate VPN host among the plurality of hosting VPNs, and a sorted list with host/network address, subnet mask, and associated VPN information is generated. The configuration information and the route table is used to expand and normalize a set of network entries.

18 Claims, 5 Drawing Sheets

(56) References Cited

U.S. PATENT DOCUMENTS

| | | | |
|---|---|---|---|
| 2011/0131647 A1* | 6/2011 | Sanders | H04L 63/0272 726/15 |
| 2013/0182651 A1* | 7/2013 | Kelkar | H04L 61/2046 370/329 |
| 2013/0239198 A1* | 9/2013 | Niemi | H04L 63/0272 726/12 |
| 2015/0047051 A1 | 2/2015 | Johns et al. | |
| 2016/0072763 A1 | 3/2016 | Short et al. | |
| 2016/0234162 A1 | 8/2016 | Sabet et al. | |
| 2019/0166099 A1 | 5/2019 | Hicks | |

OTHER PUBLICATIONS

Cheshire, "IPv4 Address Conflict Detection," Apple Inc., Jul. 2008, Network Working Group, https://tools.ietf.org/html/rfc5227, Printed on Jul. 12, 2017, pp. 1-22.

Solarwinds, "IP Address Manager," IP Address Management Software—IPAM Tools, SolarWinds, http://www.solarwinds.com/ip-address-manager?&CMP=KNC-TAD-GGL-SW_NA_US_PP_CPC_LD_EN_BRD_DWA-XPIL-X_X_X_X-X&kwid=9aNu6lkG&gclid=CKbGqdSUmNICFc-PswodNTgOPA, Copyright 2017 SolarWinds Worldwide, LLC, Printed on Jul. 12, 2017, pp. 1-4.

IBM: List of IBM Patents or Patent Applications Treated as Related (Appendix P), May 1, 2020, pp. 1-2.

\* cited by examiner

PREEMPTIVE DETERMINATION OF RESERVED IP CONFLICTS ON VPNS

BACKGROUND

Embodiments of the invention generally relate to computer networking security, and in particular to network address conflict preemption and resolution in network security environments.

Managed Security Services (MSS) refers to one or more network security functions offered by a provider, i.e. a Managed Security Services Provider (MSSP). The MSSP manages one or more virtual private networks (VPNs) and devices' communications running on the VPNs. For example, a customer having one or more customer devices with access to one or more VPNs may engage the MSSP to provide security services for network and device management. The MSSP's management services may include, for example, providing general network and device monitoring, logging, and maintenance. The management services may also include, more specifically, network access controls; network firewalls; network threat monitoring, detection and prevention; network security compliance; and intrusion investigations; to name a few.

The MSSP may provide management services through a combination of analytics tools and manual support (e.g., via an analyst/technician who is a subject matter expert).

SUMMARY

Request for Comment (RFC) 1918 can encounter IP address conflicts in its communication with customers and their devices over VPNs. It may be desirable, therefore, for a solution to this and related problems by providing MSSP functions that alleviate, or even avoid, these IP address conflicts.

Embodiments of the invention include a method, computer program product, and system, for passive determination of reserved internet protocol (IP) conflicts on one or more hosted virtual private networks (VPNs).

According to an aspect of the invention, a method for managing actual or potential internet protocol (IP) address conflicts in a virtual private network (VPN), identifies IP addresses and reserved IP address ranges of at least two remote endpoint devices in the VPN, wherein the one or more remote endpoint devices are connected, via one or more VPN tunnels and via one or more local peer devices or one or more remote peer devices, to one or more local devices that manage the VPN. The method identifies actual or potential IP address conflicts between the at least two remote endpoint devices, and resolves, preemptively, the actual or potential IP address conflicts independent of an instruction to communicate data from the one or more local endpoint devices to any of the at least two remote endpoint devices.

In an embodiment, the functions of extracting configuration information is also from a set of applicable routers.

In an embodiment, the function of extracting the route table also includes extracting filters on RFC 1918 addresses.

In an embodiment, the function of expanding and normalizing the set of network entries further includes: categorizing the input as host, range, or network and expands; converting the set of network entries to decimal; performing an iterative compare; and providing an output identifying whether a host matches an existing reservation for a host or is included in a network reservation, and also identifies whether an input range or network is a full or partial network reservation match.

In an embodiment, extracting the configuration information is performed by a computer storing the configuration information within an address space local to the computer.

In an embodiment, the VPN is an IPSEC VPN.

In an embodiment, one or more VPNs are within a computing environment that includes a managed security services (MSS) infrastructure in communication with one or more local peers. The one or more local peers are in communication with one or more remote peers via one or more communication tunnels, each of the one or more remote peers being in communication with one or more managed devices.

In an embodiment, data is communicated to an endpoint device via a VPN. The communicating includes performing network address translation (NAT) to map a conflicting RFC 1918 IP address of the endpoint device to a correct remote peer device in the VPN. In an embodiment, this is done based on outputs of the previous steps.

According to a further embodiment of the invention, a computer program product for passive determination of reserved internet protocol (IP) conflicts on one or more hosted virtual private networks (VPNs) includes a non-transitory tangible storage device having program code embodied therewith. The program code is executable by a processor of a computer to perform a method. The method includes extracting, by the processor, configuration information for a plurality of hosting VPNs to build an aggregated list of IP addresses with mask and associated VPN information. The method further includes extracting, by the processor, a route table from a router directing traffic to an appropriate VPN host among the plurality of hosting VPNs, and generating a sorted list with host/network address, subnet mask, and associated VPN information. The method also includes using, by the processor, the configuration information and the route table to expand and normalize a set of network entries.

According to yet another embodiment of the invention, a computer system for passive determination of reserved internet protocol (IP) conflicts on one or more hosted virtual private networks (VPNs) includes one or more computer devices each having one or more processors and one or more tangible storage devices, and a program embodied on at least one of the one or more storage devices. The program has a plurality of program instructions for execution by the one or more processors. The program instructions include instructions for extracting configuration information for a plurality of hosting VPNs to build an aggregated list of IP addresses with mask and associated VPN information. The program instructions also include instructions for extracting a route table from a router directing traffic to an appropriate VPN host among the plurality of hosting VPNs, and generating a sorted list with host/network address, subnet mask, and associated VPN information. The program instructions also include instructions for using the configuration information and the route table to expand and normalize a set of network entries.

DETAILED DESCRIPTION

Figure 1:
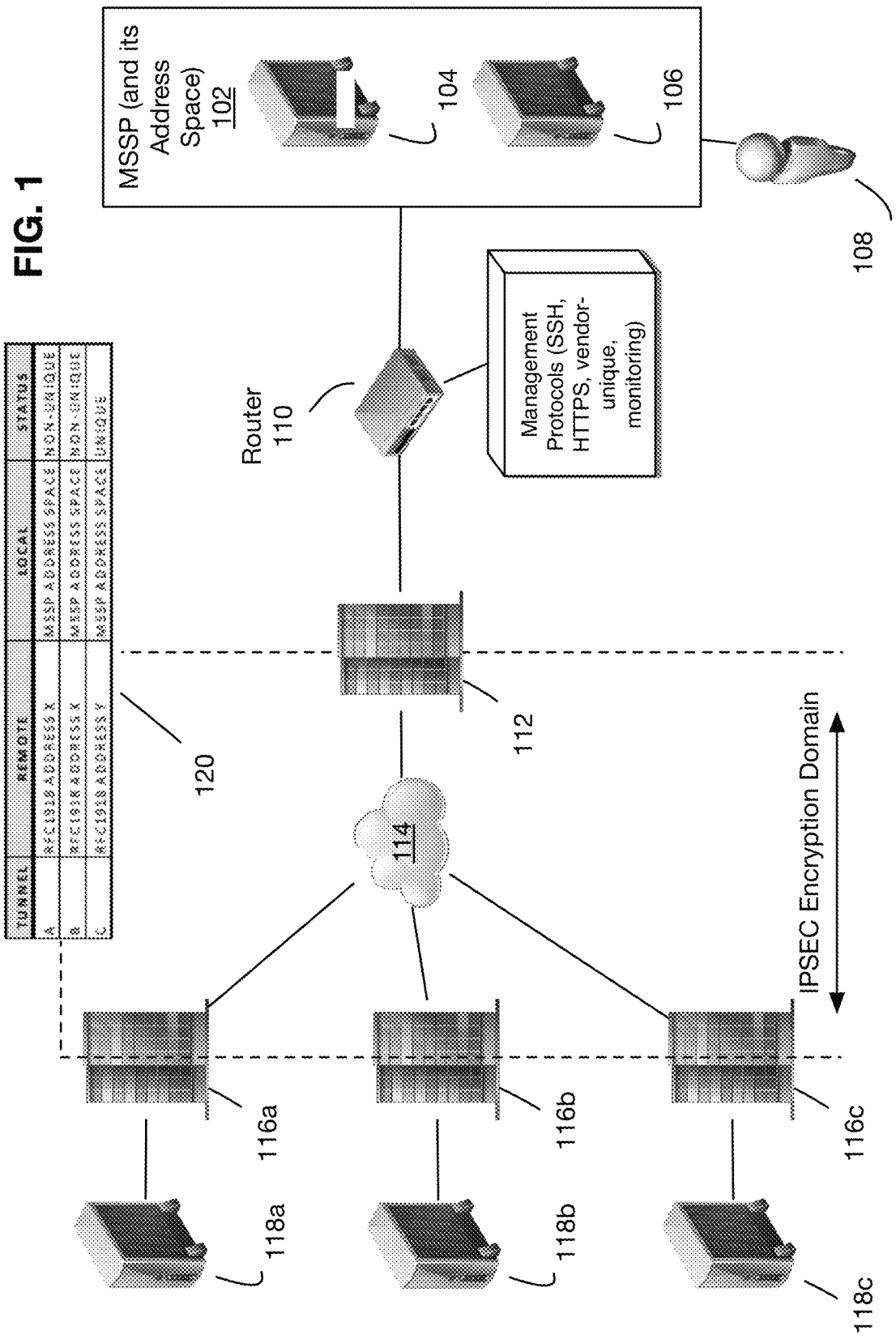
FIG. 1 is a functional block diagram of an exemplary computing environment 100 including an MSSP 102, according to an embodiment of the invention.

An MSSP provides network management services to a customer communicating with the MSSP through one or more a VPN tunnels (also referred to herein as "communication tunnels"). The VPN tunnels are generally persistent connections, connecting the MSSP's infrastructure devices (e.g., MSSP devices located at the MSSP's premises and used by an MSSP analyst), to customer devices (e.g., customer devices located at other premises). The persistent connection over the VPNs may be enabled using the Internet Protocol security (IPSEC) paradigm. A customer may communicate with the MSSP via one or more VPNs. One reason for having multiple VPNs may be to perform load balancing. However, embodiments of the invention operate even where each customer communicates with the MSSP via only one VPN.

Data transferred between the peers/endpoints of the MSSP and the customer endpoints may be encrypted while moving through the communication tunnels. The peers may share an encryption key so that on either end of a given communication tunnel, the data may be encrypted or decrypted as necessary.

IPSEC enables secured network tunneling (i.e., a VPN) between the MSSP's address domain and the customers' endpoints. In a typical setup, the MSSP and customer endpoints establish the VPN tunnels via one or more "peers", i.e., physical or virtual endpoint devices that serve as gateways to the communication tunnels. The MSSP's peers may be called "local peers", in that they are local relative to the MSSP's infrastructure devices and the MSSP's local Internet Protocol (IP) address space. The customers' peers may be called "remote peers", in that they are remote relative to the MSSP's infrastructure devices and its local IP address space.

Internal IP addresses of customer endpoint devices may be assigned using a private non-routable RFC 1918 standard, as defined in a memorandum titled "Address Allocation for Private Internets", by the Internet Engineering Task Force (IETF). The memorandum defines a paradigm and standards for assigning private IP addresses on Transfer Control Protocol (TCP)/IP networks.

Implementation of IPSEC on multiple VPNs and customer endpoint devices using RFC 1918 may inadvertently, but frequently, lead to IP address conflicts because RFC 1918 addresses are assigned in an ad-hoc and unregulated manner. Two or more customer endpoint devices managed by different customers may, therefore, have the same IP address. Therefore, although the IP addresses for the various remote peers are unique, data of a first customer may inadvertently be sent to another customer, because both customers may each have a device that shares an RFC 1918 IP address with the device of the other customer, and because these conflicting addresses all appear in the same routing tables used in the VPNs to transfer data between the MSSP and the customer endpoint devices.

The tunnel endpoints, i.e., the peers, find a network path to one another through one or more routers using IP addresses tables. Typically, the IP addresses for the peers is unique (for example, they may be IP addresses as regulated by INEC). However, more than one customer endpoint device may have the same internal IP address. In such a scenario, the same internal IP address is a conflicting address. If the MSSP attempts to communicate to customer endpoint devices via these conflicting IP addresses, data intended for one customer may potentially go to another; or, in a best-case scenario, the conflict may be detected, and the MSSP may need to engage in resource-and-time-wasting rollback operations.

As discussed above, one factor that contributes to a conflicting address causing a misguided communication between the MSSP and customer endpoints is that VPN routing data is stored in routing tables whose structure is not equipped to deal with these conflicting IP addresses. For instance, the routing tables include multiple entries each corresponding to a tunnel. In routing data to a customer endpoint, the MSSP traverses the routing table looking for the IP address of the customer endpoint to which it intends to route the data. The MSSP selects, in the routing table, the first entry that lists the IP address matching that of the customer endpoint in question; the MSSP then routes the data to whatever remote peer associated with that IP address. However, there may be multiple entries in the routing table whose IP address filed matches that of the customer endpoint that the MSSP intends to communicate with. By sending the data through the first VPN tunnel whose device endpoint IP address matches the IP address of interest, the MSSP potentially sends the information through the wrong endpoint.

There is, therefore, a need for IP address conflict preemption in these circumstances. Conflict preemption entails, in one embodiment, preemption of a conflict-blind communication through a VPN tunnel. When conflict information is known ahead of time, on the other hand (such as conflicts of specifically assigned IP addresses or reserved ranges), the MSSP can ensure proper mapping of IP addresses using Network Address Translation (NAT) functions to prevent a misguided communication before it occurs, instead of after. The solution saves computing time and resources, and prevents security and confidentiality breaches that would otherwise result from disclosure of one customer's data to another customer.

The solution to the problem of miscommunication based on IP address conflicts is not trivial. There is no robust process of managing IP addresses that already have been assigned, in use, or reserved, such that they are not assigned again to other devices engaging with the VPNs. For instance, a simple pattern match search of the VPN device configurations is unlikely to identify potentially conflicting IP addresses because the search may not reveal a reserved address space within a network range. IP address conflicts are, therefore, typically not discoverable until the conflicts occur. Once a conflict occurs, the MSSP must perform readdressing or translation operations that potentially cause significant delay or loss of connectivity for the devices experiencing the conflict.

It may be desirable, therefore, to provide solutions (such as a method, computer program product, or system), that address the above challenges, particularly before an IP address conflict arises. Some non-limiting embodiments of Applicant's claimed invention may generally provide these and related functions by leveraging a network's existing configuration backup infrastructure to provide text-based configuration via standard Linux-based scripting, such as Bourn-again shell (Bash) to retrieve relevant data for hosted VPN tunnels and associated router(s), to filter out access control lists and network objects for an RFC 1918 address space, to expand network subnets, to convert to decimal equivalent values, and to perform comparisons. The resultant output of these processes identifies whether assigned or reserved IP addresses or IP address ranges are in conflict with other such IP addresses, and prevents misrouting of data to customer endpoints. The scripts determine whether the IP addresses under consideration are host, network, a partial network, or an inclusion match.

Some embodiments of the invention, may therefore provide the following advantages. The disclosed solution may be non-intrusive, in that it does not require direct access to target devices (direct access to a target network is required in existing solutions; some even require agents to be installed on the customer VPNs). For instance, given this advantage, embodiments of the invention do not require customer availability or technical expertise; they can be done locally by the MSSP using its own existing infrastructure.

Additionally, some embodiments of the invention may be implemented via focused software, in that the software code can target VPN conflict resolution specifically. The software code can be delivered as a standalone product without the need for an entire software suit with unwanted or unneeded functions that likely will entail higher costs for the MSSP.

Furthermore, embodiments of the invention may function preemptively, in that they can be used as investigative tools to avoid address conflict issues before deployment; in this way, they can be said to be "passive". The solutions may be readily available because they can be implemented via standard Linux scripting tools having scheduling capabilities.

Referring generally to embodiments of the invention, the MSSP manages a set of VPNs and customer endpoint devices' activities on the VPNs. The MSSP maintains one or more configuration files for each VPN host device that it manages. The VPN host devices are associated with routers, each having its own configuration file(s). Configuration files for VPN host devices and their associated routers include IP address information and associated metadata. IP address information generally refers to individual IP addresses assigned to a specific device(s) (e.g., a host device or a managed device); a reserved address range whose individual addresses are served for assignment to specific devices; network addresses (such as Class A, Class B, and Class C network ranges defined in RFC 1918); and subnet masks and associated VPN information. The addresses stored in the various configuration files may be RFC 1918 addresses; i.e., addresses assigned, reserved, or otherwise managed according to RFC 1918. IP addresses may be stored in various forms and representations, such as decimal representations.

According to embodiments of the invention, the MSSP may execute various scripts to read data from, write data to, and process information contained in the configuration files described above to accomplish one or more functions of the embodiments of the invention. The scripts may be written in any scripting language and executed in any operating system. For example, the scripts may be Bash scripts executable by a computing device running a Linux-based operating system. It shall be apparent to persons of ordinary skill in the art that these functions may be implemented using other programming or scripting languages and adapted for other operating systems, to perform substantially the same functions to achieve substantially the same results, without departing from the spirit or scope of the claimed invention.

A brief overview of embodiments of the invention as they related to the Figures is provided below. Thereafter, the Figures are discussed, in turn, in more detail.

For example, according to an embodiment of the invention, the MSSP may operate in a computing environment including various devices, network components, and connecting devices, having various IP addresses, network addresses, and address ranges. An Illustrative example of such a computing environment and its various components is provided as computing environment 100 in FIG. 1.

For example, according to an aspect of the invention, a first Bash script for deployment by the MSSP may be provided. Aspects of the first Bash script are described in greater detail with reference to FIG. 2 and method 200. Preliminarily, aspects of the first Bash script are provided here. The first Bash script may be called, for example, reserved.bash. Generally, reserved.bash may extract configuration information from a given hosting VPN device(s) and associated routers to generate or build an aggregated list(s) of IP addresses with corresponding mask and associated VPN information. The reserved.bash script may, for example, extract VPN configuration information, filter the extracted information based on RFC 1918 addresses, identify and categorize the filtered addresses as either host addresses or network addresses, convert mask addresses to CIDR formatted addresses, produce a sorted list of host and network addresses, subnet masks, and associated VPNs. Through these and other functions, reserved.bash may identify some IP addresses that already may have been assigned or reserved for assignment. The list that reserved.bash produces can be consulted by other processes when communicating a to an IP address to determine whether the assignment may lead to an IP address conflict.

As a further example, according to an aspect of the invention, a second Bash script for deployment by the MSSP may be provided. Aspects of the second Bash script are described in greater detail with reference to FIG. 3 and method 300. Preliminarily, aspects of the second Bash script are provided here. The second Bash script may be called, for example, cproutes.bash. Generally, cproutes.bash extracts a route table from a router that directs traffic to an appropriate VPN host, filters the extracted addresses based on RFC 1918, and produces a sorted list with host and network address, subnet mask, and associated VPN information. Through these and other functions, cproutes.bash may identify some IP addresses that already may have been assigned or reserved for assignment. The list that reserved.bash produces can be consulted by other processes when communicating a to an IP address to determine whether the assignment may lead to an IP address conflict.

As yet a further example, according to an aspect of the invention, a third Bash script for deployment by the MSSP may be provided. Aspects of the third Bash script are described in greater detail with reference to FIG. 4 and method 400. Preliminarily, aspects of the third Bash script are provided here. The third Bash script may be called, for example, conflict.bash. Generally, conflict.bash uses the output of one or both of the above-referenced scripts (e.g., lists outputted by the first and second Bash scripts, reserved.bash and cproutes.bash) and expands network entries, converts them to a decimal range list, categorizes the input as host, range, or network addresses, and expands and converts them to decimal representations, performs an iterative compare, and produces an output identifying whether the host matches an existing reservation for a host or is included in a network reservation, and further identifies whether an input range or network is a full or partial network reservation match. Outputs of conflicts. bash can be consulted by other processes when communicating a to an IP address to determine whether the assignment may lead to an IP address conflict.

It shall be apparent to a person of ordinary skill in the art that each function described in the context of computing environment 100, and methods 200, 300, and 400 in FIGS. 1, 2, 3, and 4, may be beneficial but are not required for the practice of embodiments of Applicant's invention. Rather, the invention is set forth in the claims.

Referring now to FIG. 1, a computing environment 100 is provided. Computing environment 100 may include one or more VPNs (e.g., customer VPNs) or VPN tunnels for communication with one or more customer endpoints (and in turn, customer endpoint devices 118*a-c*) by an MSSP 102 having management infrastructure 104 and a command proxy pool 106. Managing infrastructure 104 refers generally to a collection of physical or virtual devices that enable the MSSP's management functions, including, for example, executing management scripts (such as those described in connection with FIGS. 2, 3, and 4). A command proxy pool 106 (e.g. a remote desktop connection) enables an MSSP analyst 108 to perform management functions (e.g., audits) without directly connecting to customer devices and VPNs. The analyst connects, instead, to the proxy pool. An analyst 108, i.e., a user, may engage with MSSP 102 to monitor or control MSSP 102 and provide management services to customers.

MSSP 102 may have an associated address space, i.e., its local address space. MSSP 102 may be in communication with one or more MSSP local peers 112 via one or more routers 110. Router 110 implements one or more management protocols (such as SSH, HTTPS, MSSP-vendor-specific protocols, and monitoring protocols), and generally may serve to route a given IP address X between MSSP 102 and the various MSSP local peers 112. Router 110 may maintain one or more routing tables. MSSP 102 may reference, in its communications to local peers 112, customer endpoint device addresses (which are RFC 1918) addresses.

Computing environment 100 may also include an intermediary network 114 including a set of routers and other devices that complete the communication tunnels between the MSSP's local peers 112 and the remote peers 116. The infrastructure (devices and data such as routing tables) between local peers 112 and remote peers 116, including intermediary network 114, collectively form the VPNs or communication tunnels. There may be as many VPNs as there are customers; or a given customer can have more than one associated VPN.

In the depicted environment of FIG. 1, MSSP local peers 112 may communicate via network tunnels as provided in network 114 to one or more remote peers 116. For example, remote peers 116 may include remote peer 116*a*, 116*b*, 116*c*, corresponding to "CUST A REMOTE PEER", "CUST B REMOTE PEER", and "CUST C REMOTE PEER". In the depicted example, the acronym "CUST" refers to a "Customer", such as Customer A, B, or C. The abbreviations "CUST [A/B/C] MGD DEV RFC 1918 ADDRESS X" refers to "Customer [A/B/C] managed device RFC1918 address X".

According to an aspect of the invention, router 110, MSSP local peers 112, and remote peers 116 collectively operate in an IPSEC encryption domain, and use one or more routing tables 120 that provide tunnel information including remote RFC 1918 addresses of customer endpoint devices, local MSSP addresses, and status information (e.g., unique or non-unique). In the depicted example (as seen in routing table 120), Tunnel A (the VPN or communication tunnel to Customer A) has a remote address (RFC 1918 address X) and an MSSP local address that is not unique; i.e., at least one other customer's endpoint device uses the same RFC 1918 address. In fact, the same is true, in the depicted example, with Tunnel B and Customer B. However, in the case of Tunnel C and Customer C, the addresses are unique. In this scenario, in the prior art, data for Customer A may be inadvertently routed to Customer B, and vice versa, because the RFC 1918 addresses are not unique. To avoid this problem, costly and manual operations may need to be performed to correct the conflict. Embodiments of the invention, on the other hand, can prevent this problem.

Figure 2:
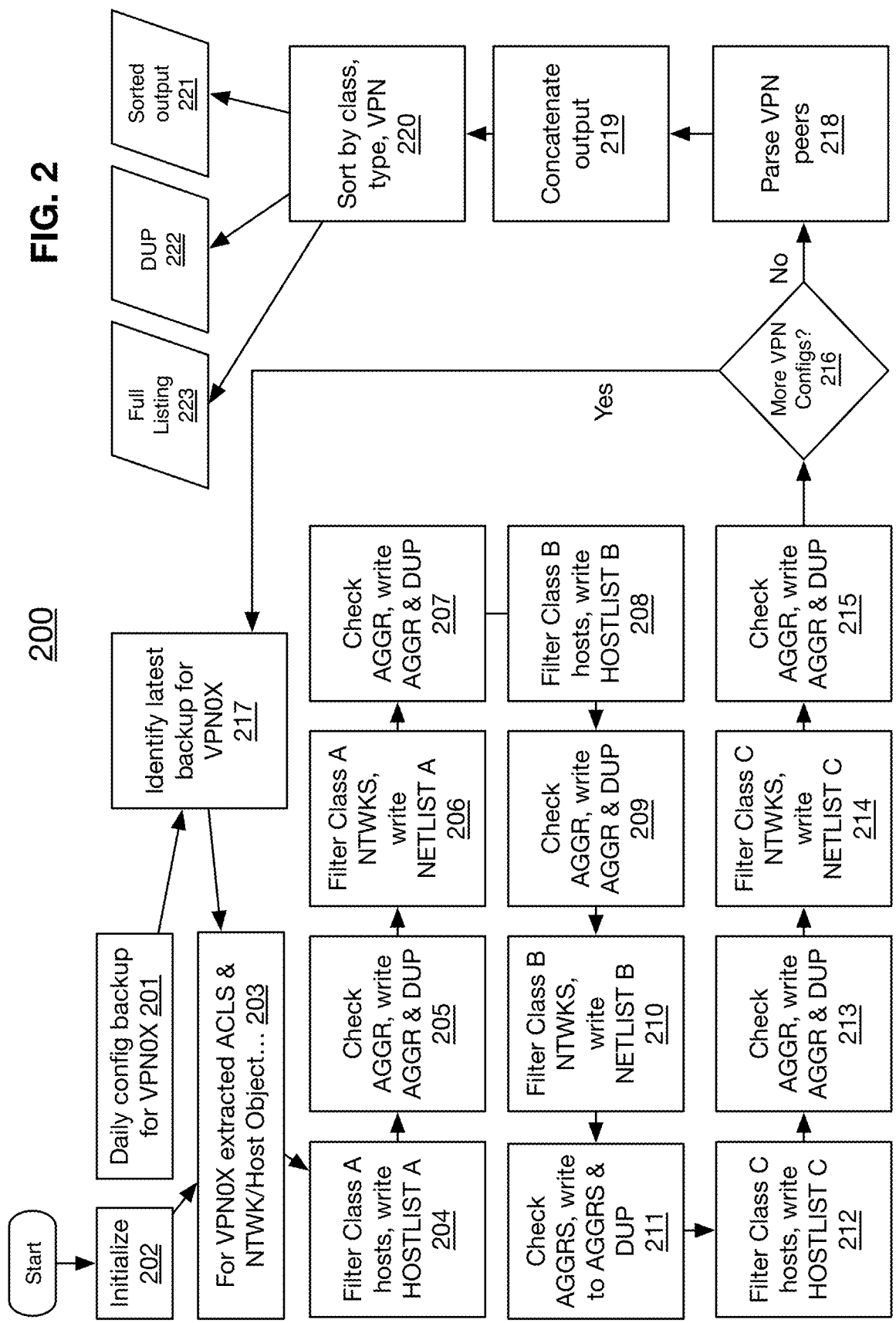
FIG. 2 is a flowchart illustrating functional steps of a method 200 operable in computing environment 100 (FIG. 1), according to an embodiment of the invention.

Referring now to FIG. 2, a flowchart of functional steps of a method 200 performed by executing programming instructions of a first Bash script, for deployment by MSSP 102 (FIG. 1), is provided, according to an embodiment of the invention. The first Bash script may be called, for example, reserved.bash. In the following discussion, the terms "method 200" and "reserved.bash" are used interchangeably.

Referring now to FIGS. 1 and 2, programming instructions of reserved.bash may be executed by one or more processors of MSSP 102. Some or all of the following functions may be performed. In the following, it is assumed that three classes of hosts exist in the VPN: Class A, Class B, and Class C.

reserved.bash may periodically (such as daily) create (step 201) backups for one or more VPNs, VPN0 X. Additionally, reserved.bash may periodically initialize (step 202) variables, temporary files (e.g. lists), and various counters (collectively, "resources"). These resources generally enable MSSP 102, via execution of method 200, to regularly perform IP address conflict prevention. The resources may include, for example, one or more class lists, host lists, aggregate lists, network lists, duplicate lists, and full lists.

reserved.bash may, for each VPN host device "VPN0 X", extract (step 203) corresponding access control lists (ACLs) and network and host objects. For each VPN0 X, reserved.bash may perform one or more of the steps 204-215, described below.

reserved.bash may filter (step 204) a first class of host devices, Class A, and write (step 204) the results to a list, HOSTLIST A.

reserved.bash may check (step 205) the hosts listed in HOSTLIST A against an aggregate host list, AGGR list, and write (step 205) the results to the AGGR list after performing deduplication. reserved.bash may also write (step 205) any duplicates found, in the deduplication process, to a duplicates list DUP.

reserved.bash may filter (step 206) Class A networks, NTWKS, and may write (step 206) the results to NETLIST A.

reserved.bash may check (step 207) NETLIST A against AGGR List and write (step 207) to the AGGR List based on DUP operations, and may further convert (step 207) the IP addresses to Classless Inter-Domain Routing (CIDR) addresses. reserved.bash may also write (step 207) any duplicates found to a duplicates list DUP (this may be the same list as written to in step 205).

reserved.bash may filter (step 208) Class B hosts, and write (step 208) the results to a list HOSTLIST B.

reserved.bash may check (step 209) the hosts listed in HOSTLIST B against the aggregate host list, AGGR list, and write (step 209) the results to the AGGR list after performing deduplication. Reserved.bash may also write (step 209) any duplicates found to a duplicates list, DUP.

reserved.bash may filter (step 210) Class B networks, NTWKS, and write (step 209) the results to NETLIST B.

reserved.bash may check (step 211) NETLIST B against AGGR List and write (step 211) to the AGGR List based on DUP operations, and may further convert (step 211) the IP addresses to CIDR addresses. reserved.bash may also write (step 211) any duplicates found to a duplicates list, DUP.

reserved.bash may filter (step 212) Class C hosts, and write (step 212) the results to a list, HOSTLIST C.

reserved.bash may check (step 213) the hosts listed in HOSTLIST C against the aggregate host list, AGGR list, and write (step 213) the results to the AGGR list after performing deduplication. reserved.bash may also write (step 213) any duplicates found to a duplicates list, DUP.

reserved.bash may filter (step 214) Class C networks, NTWKS, and write (step 214) the results to NETLIST C.

reserved.bash may check (step 215) NETLIST C against AGGR List and write (step 215) to the AGGR List based on DUP operations, and may further convert (step 215) the IP addresses to CIDR addresses.

reserved. bash may check (step 216) whether there are more VPN configuration files to cycle through. If so (yes branch), reserved.bash may identify (step 217) a latest backup for a given additional VPN0 X under consideration. Furthermore, this step may be performed periodically according to a preconfigured or event-based schedule. If no more VPN configuration files are left (no branch) to cycle through (at least during the current operation cycle), reserved.bash may parse (step 218) the various VPN peers 116. The parsed outputs may be concatenated (step 219), sorted (step 220) by class, type, and VPN host device, and the sorted output provided (step 221) for reference (e.g. by Analyst 108, or output to memory or communicated over a network). reserved.bash may also provide (step 222) the duplicates list DUP and provide (step 223) the full listing. Parsing (step 218) may include traversing through a large text file to perform pattern matching and extraction of matched patterns. For example, a specific IP address or set of IP addresses meeting the match criteria may be located, and their associated metadata identified and retrieved.

Through the above-described functions of reserved.bash, MSSP 102 canvasses the existing specific RFC 1918 addresses as indicated in the MSSP's own infrastructure and the VPNs' routing tables, to discover assigned and reserved specific IP addresses, host addresses, address ranges, and network addresses.

Figure 3:
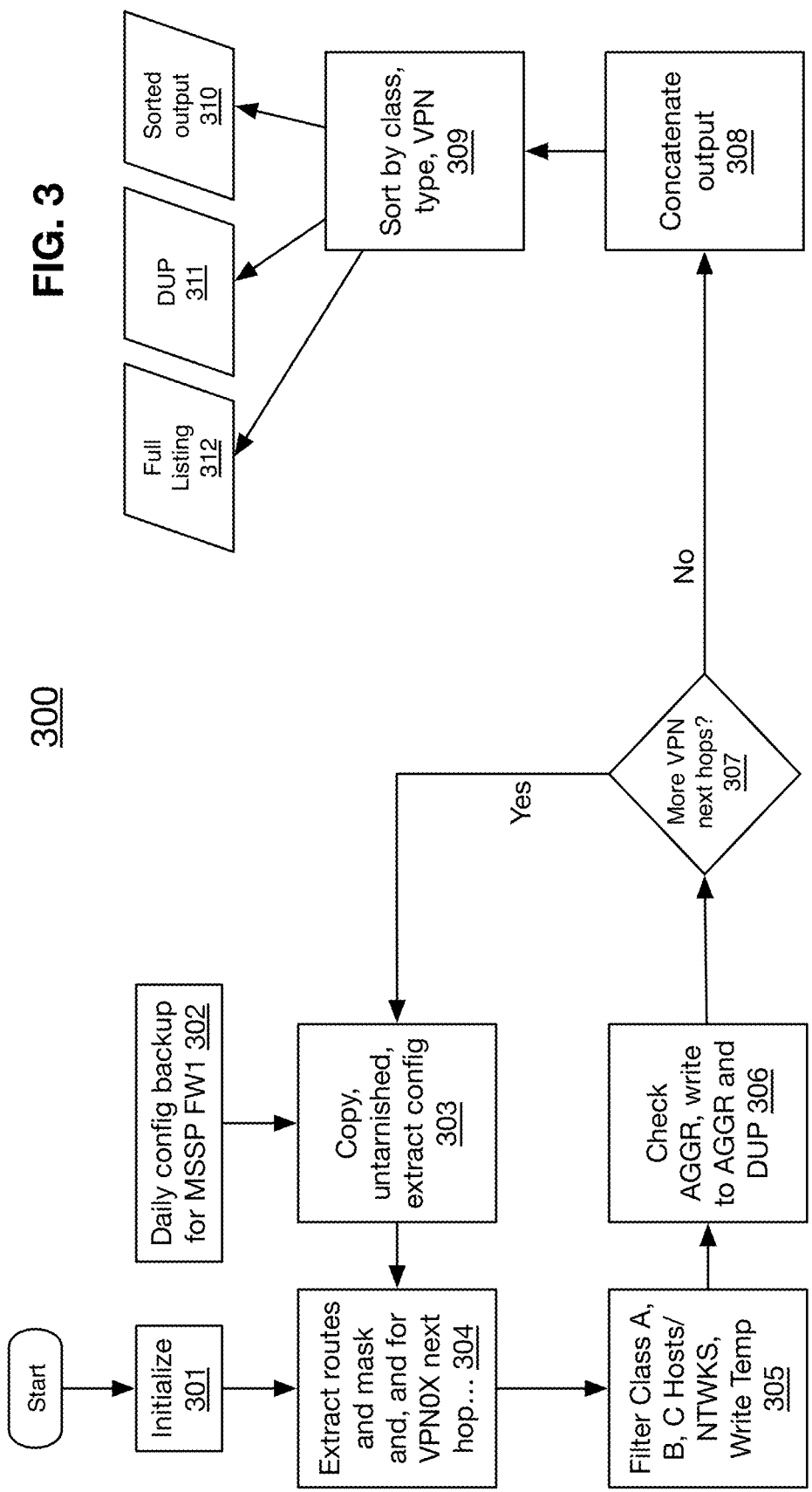
FIG. 3 is a flowchart illustrating functional steps of a method 300 operable in computing environment 100 (FIG. 1), according to an embodiment of the invention.

Referring now to FIG. 3, a flowchart of functional steps of a method 300 performed by executing programming instructions of a second Bash script, for deployment by the MSSP, is provided, according to an embodiment of the invention. The second Bash script may be called, for example, cproutes.bash. In the following discussion, the terms "method 300" and "cproutes.bash" are used interchangeably.

Referring now to FIGS. 1 and 3, programming instructions of cproutes.bash may be executed by one or more processors of MSSP 102. Some or all of the following functions may be performed.

cproutes.bash may periodically (e.g., daily) generate (step 302) configuration backups of MSSP FW1 (firewall 1; firewalls act as routers for the communication tunnels). cproutes.bash may perform (step 303) copy, un-tar, or, extract configuration files as needed.

cproutes.bash may also periodically initialize (step 301) variables, temporary files, and counter.

cproutes.bash may extract (step 304) network route and mask information for a given VPN0 X and its next hop. Routing tables define target hosts and a mask defines a range of addresses. The next hop is the "next stop" that the route device knows to send incoming traffic to (e.g., VPN 1, VPN 2, etc.).

cproutes.bash may filter (step 305) Class A, B, and C hosts and networks, and write (step 305) the results to a temporary list.

cproutes.bash may check (step 306) the temporary list against the AGGR list and write (step 306) the unique results to the AGGR list, and write (step 306) the duplicates in the DUP list. It should be appreciated that the AGGR list, at this point, contains assigned or reserved unique IP addresses and ranges, and their classifications, whereas DUP contains any duplicates found.

cproutes.bash may check (step 307) whether there is any additional VPN next hop to be evaluated. If so (yes branch), the process returns to step 304. If no, cproutes.bash may concatenate (step 308) its output, sort (step 309) it by class, type, and VPN, and generate (step 310) a sorted output. cproutes.bash may also generate (step 311) an updated duplicates list and generate (step 312) an updated full list.

Figure 4:
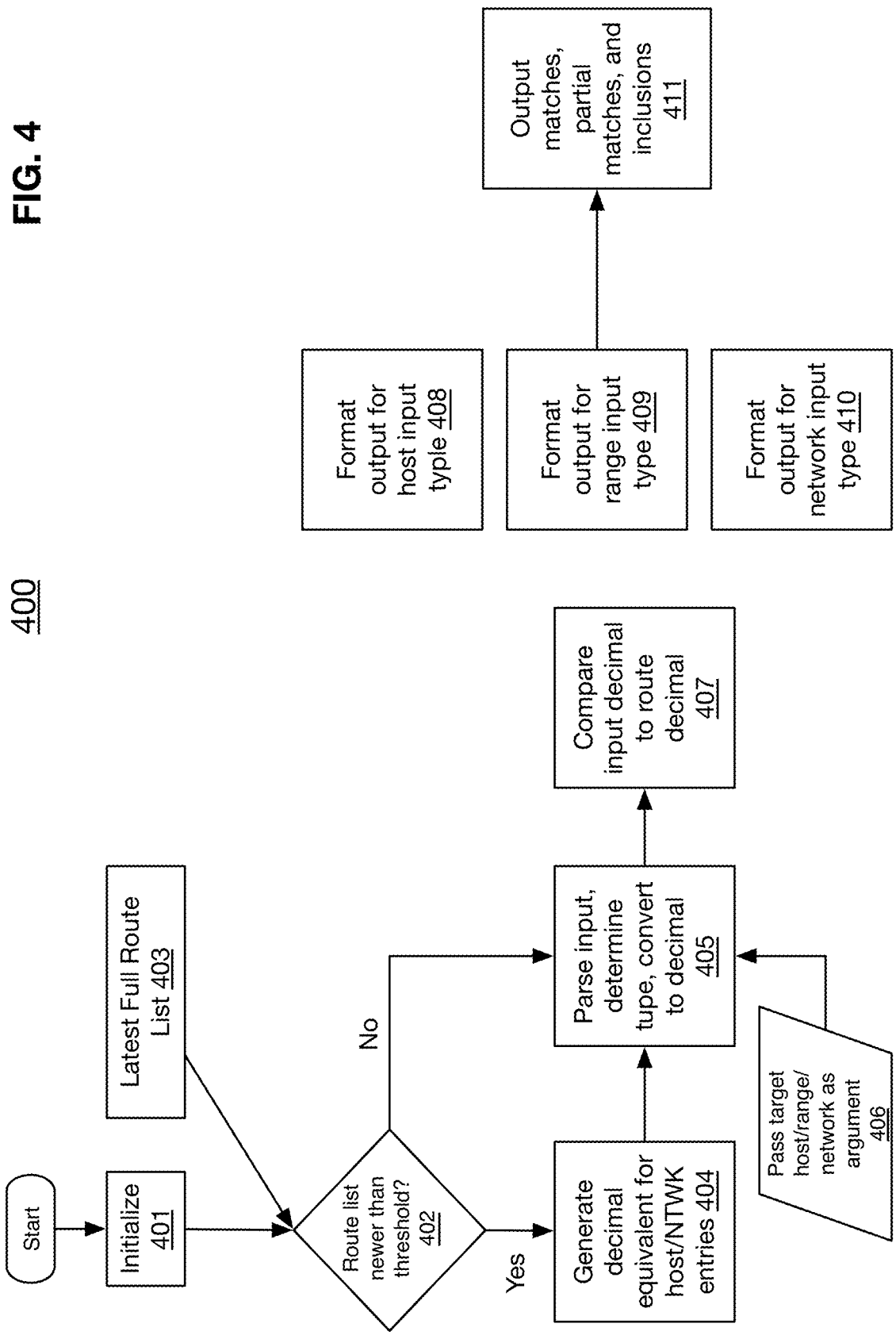
FIG. 4 is a flowchart illustrating functional steps of a method 400 operable in computing environment 100 (FIG. 1), according to an embodiment of the invention.

Referring now to FIG. 4, a flowchart of functional steps of a method 400 performed by executing programming instructions of a third Bash script, for deployment by the MSSP, is provided, according to an embodiment of the invention. The third Bash script may be called, for example, conflicts.bash. In the following discussion, the terms "method 400" and "conflicts.bash" are used interchangeably.

Referring now to FIGS. 1 and 4, programming instructions of conflicts.bash may be executed by one or more processors of MSSP 102. Some or all of the following functions may be performed.

conflicts.bash may periodically initialize (step 401) variables, temporary files, and counters as needed.

conflicts.bash may periodically receive (step 403) the latest full route list. conflicts.bash may check (step 402), based on the latest full route list (from cproutes.bash), whether the MSSP's route list is newer than a decimal value (e.g., a threshold value). If not (no branch), conflicts.bash may generate (step 404) decimal equivalents for host and network entries in the full route list. Otherwise (yes branch), conflicts.bash may proceed to parsing (step 405) the decimal equivalents of the entries of the route list (whether as they existed or as updated at step 404) to determine each entry's type, and converts (step 405) the entry to a decimal format. The parsing function (performed at step 405) may receive (step 406) as an input (e.g., as an argument) target host, range, and network addresses.

conflicts.bash may compare (step 407) the input decimals to the route list decimals. conflicts.bash may format (step 408) output for the host input type; format (step 409) output for the range input type; and format (step 409) output for the network input type. These formatted outputs may be used to output (step 411) full matches, partial matches, and inclusions. These matches and inclusions allow the MSSP to identify which IP addresses or ranges are available, and which are not. IP addresses or ranges that are not available will not be assigned within the VPN so as to avoid a conflict.

Referring now generally to FIGS. 1-4, according to some embodiments of the invention, MSSP 102 may execute various Bash scripts (including those described above, and others); the methods that the scripts implement may operate as follows and generate sample output, as indicated.

MSSP 102 may determine VPN tunnel parameters based on customer ID and/or customer name. MSSP 102 may compile listings of all RFC-1918 address space defined by the currently deployed VPN peers and the primary MSS checkpoint firewall static route table.

MSSP may identify inactive, duplicate, and suspect VPN tunnel definitions for RFC-1918 address space. MSSP may identify IP address conflicts for RFC-1918 address space provided host, range, or subnet input specifications.

In some embodiments of the invention, a few assumptions may be made: scripts will not access customer endpoint devices directly, but will instead extract information from locally available daily configuration backups; IP address domain is limited to RFC-1918 private address space; route tables from primary and secondary MSSP checkpoint firewalls are identical.

In one embodiment, MSSP 102 may execute a vpnsrch.bash script (e.g., usage: ./vpnsrch<customer ID>optional<customer name>). Based on argument(s) identifying customer ID and/or customer name, the script queries the latest configuration backup file for all (e.g., V01-vpn05) to match an ACL listing. If one or more matches are found, the script expands the object-group defining the remote encryption domain. The script also returns crypto-map number, peer address, Perfect Forward Secrecy (PFS) setting, transform set, and security association lifetime. A sample output of vpnsrch.bash is provided in TABLE 1, below.

TABLE 1

Customer P000002387 ACL VPN-P000002387-129.41.204.18 found in vpn03 config file:
access-list VPN-P000002387-129.41.204.18 extended permit ip object-group IBM-ISS-Specific
object-group VPN-P000002387_Remote
Customer expanded object: VPN-P000002387_Remote
network-object host 10.0.243.73
network-object host 10.0.243.74
network-object host 10.3.100.190
network-object host 10.3.100.191
.
network-object host 198.22.112.35
network-object host 198.22.112.36
network-object host 198.22.112.37
network-object host 198.22.112.54
Crypto map settings for vpn VPN-P000002387-129.41.204.18:
Map number: 643
Peer address: 129.41.204.18
Transform set: ESP-AES-256-SHA
Security association time (seconds): 43200

In one embodiment, MSSP 102 may execute a reserved.bash script (e.g., as described above in connection with FIG. 2). The script extracts reserved RFC 1918 addresses defined on each of the MSSP VPN peers 116 from most recent backup configuration files, and identifies duplicates within the device and between devices. The script sorts the addresses numerically, converts them to CIDR notation, and tags them with associated VPN host(s). The script provides a dated text (csv) output with IP address, CIDR mask, associated VPN, and associated remote object name in both raw listing and listing sorted by hosting VPN and RFC 1918 Class. Duplicate entries are identified with the annotation "(duplicate)". A sample output of reserved.bash is provided in TABLE 2, below.

TABLE 2

Full output (sorted hosts followed by sorted networks)
10.0.0.67 32:vpn03 P000002042
10.0.0.68 32:vpn03 P000002042
10.0.0.69 32:vpn03 P000002042
10.0.101.12 32:vpn02 CIDS704848
10.0.101.13 32:vpn02 CIDS704848
10.0.101.14 32:vpn02 CIDS704848
10.0.101.33 32:vpn02 CIDS704848
10.0.101.34 32:vpn02 CIDS704848
10.0.101.35 32:vpn02 CIDS704848
10.0.1.1 32:vpn03 VPN-P000001361-[name]
10.0.114.14 32:vpn03 [name]
10.0.114.15 32:vpn03 [name]
.
192.168.80.0 24:vpn02 vpn-CIDD706467 (duplicate)
192.168.84.0 27:vpn03 P000001645-[name]-194.9.164.5
192.168.84.32 27:vpn03 P000001645-[name]-194.9.164.5
192.168.86.128 27:vpn01 CIDS704799
192.168.86.128 27:vpn01 VPN-CIDS704799-[name]
192.168.86.160 27:vpn01 CIDS704799
192.168.90.0 29:vpn03 TIS_[name]-202.212.222.144
192.168.90.0 29:vpn03 TIS_[name]-P000002019
Sorted output:
Run date: 12-06-16
VPN01 reserved class A RFC-1918 host addresses (qty: 304)
10.90.235.33 32 P000001930-SI2M
10.90.235.133 32 P000001930-SI2M
10.6.17.114 32 CIDS704768-85.235.240.131
10.6.17.115 32 CIDS704768-85.235.240.131
10.6.17.123 32 CIDS704768-85.235.240.131
10.201.20.165 32 [name]
10.220.42.140 32 [name]
10.220.20.164 32 [name]
10.220.20.165 32 [name]
.

TABLE 2-continued

VPN02 reserved class B RFC-1918 network addresses (qty: 17)
172.16.96.0 27 CIDS704799
172.16.10.4 32 VPN-CIDD706857-158.52.1.246
172.16.120.170 31 P000000935-[name]
172.16.47.76 31 P000000935-[name]
172.16.50.0 24 VPN-CIDD707812-165.228.108.126
172.20.0.160 27 P000000175 (duplicate)

TABLE 2-continued 172.21.67.80 28 VPN-CIDS704991-194.0.196.5
172.23.11.0 24 CIDD706467 (duplicate)
172.23.11.0 24 vpn-CIDD706467 (duplicate)
172.24.1.0 27 JPID001046
172.25.4.9 32 VPN-CIDD706857-158.52.1.246
172.25.153.0 24 VPN-P000000741-[name]
172.25.153.0 24 VPN-P000000741-[name] (mult entry)
172.27.50.0 24 VPN-CIDD707812-[name]
172.28.105.208 28 P000000223-195.35.111.205
172.30.39.0 28 CIDD707774-62.176.63.40
172.30.40.224 28 CIDD707774-62.176.63.40

In one embodiment, MSSP 102 may execute a cproutes.bash script (e.g., as described above in connection with FIG. 3). The script checks for existence of source configuration files dated for the current day and, if not present, fetches and unpacks the most recent configuration/active file from the primary MSSP 102 checkpoint firewall into a working directory. The script parses out the routed entries for RFC 1918 host and network address space, associates the entry with the hosting VPN ID, and identifies duplicate address entries. The output is presented as a sorted listing of host entries followed by network entries. Duplicate entries are identified with "(duplicate)". A sample output of reserved.bash is provided in TABLE 3, below.

TABLE 3

10.0.0.0 16:vpn01
10.0.0.17 32:vpn03

TABLE 3-continued 10.0.0.18 32:vpn03
10.0.0.52 32:vpn01
10.0.0.64 32:vpn01
10.0.0.67 32:vpn03
10.0.0.68 32:vpn03
10.0.0.69 32:vpn03
10.0.0.74 32:vpn03
10.0.0.75 32:vpn03
10.0.100.1 32:vpn05
10.0.100.252 32:vpn05
10.0.100.253 32:vpn05
10.0.100.254 32:vpn05
10.0.101.12 32:vpn02

TABLE 3-continued 10.0.101.13 32:vpn02
10.0.101.14 32:vpn02
10.0.101.33 32:vpn02
10.0.101.34 32:vpn02
10.0.101.35 32:vpn02

In one embodiment, MSSP 102 may execute a conflicts.bash script (e.g., as described above in connection with FIG. 4; e.g., usage: ./conflict <host IP|IP range|CIDR subnet|text file>). The script is provided input information as an argument defining the target host IP, IP range, CIDR subnet, or text file with multiple entries, and if current (same day) route and VPN list (rtefull-<date>.csv and rsvdfull-<date>.csv) exists, the script parses routes and VPN entries for matches with input target(s). The script identifies host matches, matches within a subnet and partial matches (for subnet and range inputs) and source type, i.e. route table vs VPN listing. A sample output of conflicts.bash is provided in TABLE 4, below.

TABLE 4

Router matches from 11-30-16 config:
10.176.113.49 matched by network entry 10.176.113.0/24 on VPN03
10.176.113.50 matched by network entry 10.176.113.0/24 on VPN03
Match count: 2
VPN matches from 12-06-16 configs:
10.176.113.49 matched by network entry ntwk 10.176.113.0/24 on VPN03
10.176.113.50 matched by network entry ntwk 10.176.113.0/24 on VPN03
Match count: 4
Run date: 12-19-2016
Input count: 2
Elapsed time: 66

In one embodiment, MSSP 102 may execute a cleanup.bash script (e.g., usage: ./cleanup <optional:cidr threshold>). The script matches an expanded output of script cproutes.bash against a formatted list of inactive hosts extracted from a remedy.bash script (see below) to identify removal candidates. The script identifies active hosts/customers within large (defined by threshold mask) network route entries as candidates for conversion to host route or, if no active IPs are found, within the network route domain marks the route as a deletion candidate. The script also identifies route entries with IP address domains greater than the threshold passed as an optional argument (defaults to /24). A sample output of cleanup.bash is provided in TABLE 5, below.

TABLE 5

Host route(s) found for inactive ip 192.168.9.8, customer [name] to vpn01
Host route(s) found for inactive ip 192.168.9.8, customer [name] to vpn01
Host route(s) found for inactive ip 192.168.99.191, customer [name] to vpn02
Host route(s) found for inactive ip 192.168.99.194, customer [name] to vpn02
Host route(s) found for inactive ip 192.168.99.195, customer [name] to vpn02
Inactive host route matches: 1380
Network route 10.0.0.0/16 pointing to vpn01 - host route candidates:
IP: 10.0.0.12 customer: [name] status: Active

TABLE 5-continued

IP: 10.0.0.14 customer: [name] status: Active
IP: 10.0.0.15 customer: [name] status: Active
IP: 10.0.0.31 customer: [name] status: Active
IP: 10.0.10.2 customer: [name] status: Active
IP: 10.0.10.4 customer: [name] status: Active
IP: 10.0.128.17 customer: [name] status: Active .
Network route 10.15.100.0/22 pointing to vpn01 - host route candidates:
No matches - deletion candidate.

.
Elapsed time: 18316 seconds
Total number of host routes: 5358
Total number of network routes: 641

In one embodiment, MSSP 102 may execute a remedysort.bash script (e.g., usage: ./remedysort). The script takes a remedy record dump and strips out records with no or invalid external IP address field and non-RFC 1918 addresses and formats them into a comma separated text file with IP address, customer name, and deployment status. A sample output of remedysort.bash is provided in TABLE 6, below.

TABLE 6

10.0.0.0,[Customer A],Inactive
10.0.0.11,[Customer B],Inactive
10.0.0.123,[Customer C],Inactive
10.0.0.124,[Customer C],Inactive
10.0.0.12,[Customer D],Active
10.0.0.130,[Customer C],Inactive
10.0.0.130,[Customer E],Inactive
10.0.0.131,[Customer C],Inactive
10.0.0.134,[Customer F],Inactive
10.0.0.145,[Customer C],Inactive
10.0.0.14,[Customer D],Active
10.0.0.151,[Customer C],Inactive
10.0.0.154,[Customer C],Inactive
10.0.0.156,[Customer C],Inactive
10.0.0.157,[Customer C],Inactive
10.0.0.158,[Customer C],Inactive It should be noted that the descriptions provided in connection with the various scripts discussed above, and their sample outputs, is for illustration purposes only, and should not be taken to limit the scope of Applicant's claimed invention. Moreover, as the sample outputs have been derived actual deployment of scripts, they contain customer information (e.g., a customer's name) that has been anonymized, using the notation "[name]" or "Customer D", etc. These notations have been used interchangeably in some instances. For example, a customer represented by "Customer D" may be referenced, in another portion of the output, simply by "[name]". In other instances, entries referencing "[name]" may actually refer to different customers.

Referring now generally to embodiments of the invention and FIGS. 1-5, the disclosed embodiments of the invention provide MSSP 102 with the information it needs to selectively perform NAT operations on any customer endpoint device IP address that is known to conflict with the IP address of another such device; or and IP address that is part of a reserved address space. Selective NAT reduces the need to perform NAT operations for every communication without sacrificing communication integrity that otherwise may occur when dealing with customer endpoint devices having RFC 1918 addresses. Since misguided communications are avoided, there are no expensive rollback operations. Because embodiments of the invention use information local to the MSSP and/or the VPN devices, the MSSP does not require direct customer endpoint device access to provide its solution.

Figure 5:
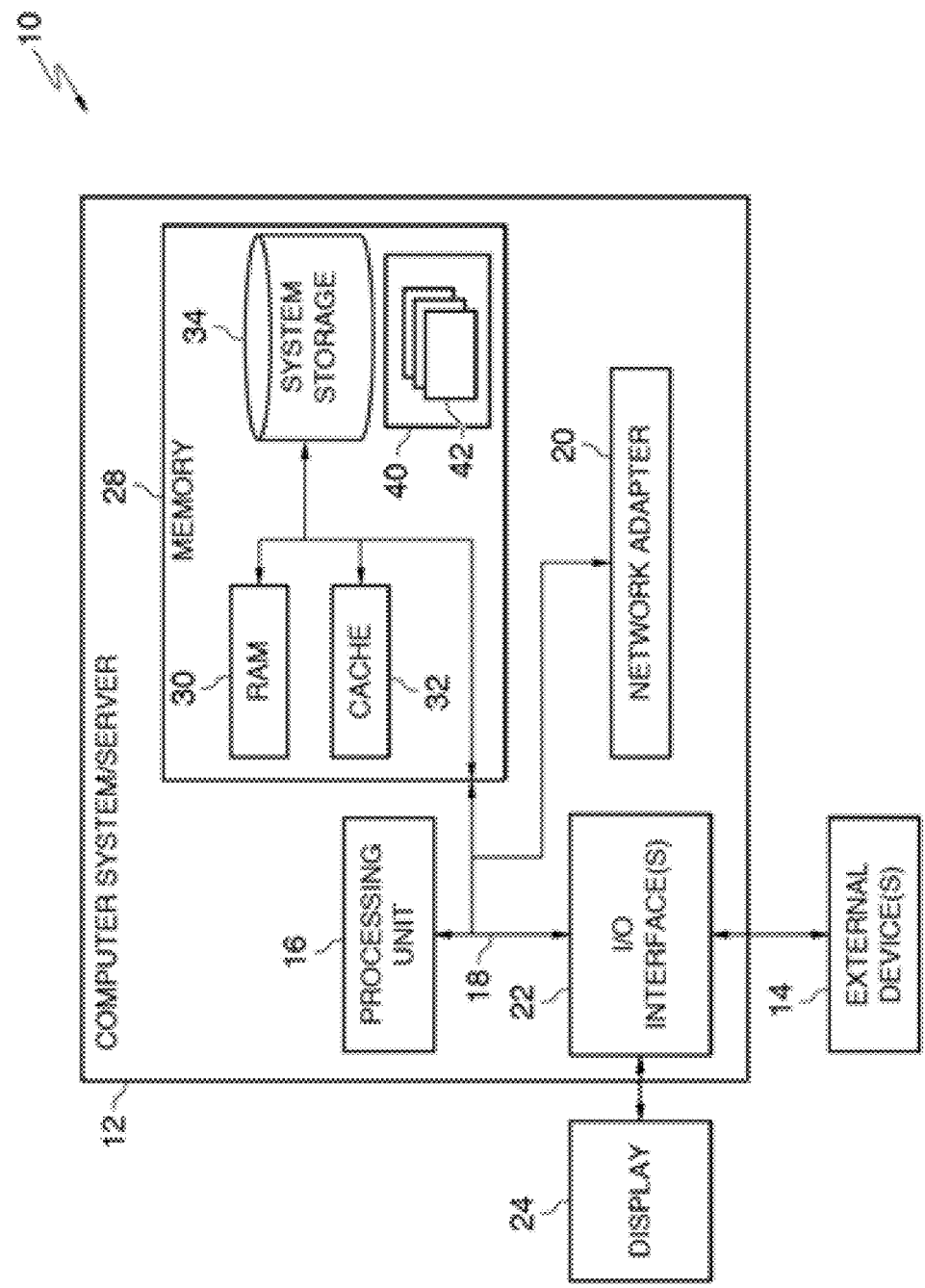
FIG. 5 is a functional block diagram of an exemplary computing device, according to an embodiment of the invention.

Referring now to FIG. 5, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein.

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now generally to embodiments of the present invention, the embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing actual or potential internet protocol (IP) address conflicts in a virtual private network (VPN), comprising:
   identifying IP addresses and reserved IP address ranges of at least two remote endpoint devices in the VPN, wherein the at least two remote endpoint devices are connected, via one or more VPN tunnels and via one or more local peer devices or one or more remote peer devices, to one or more local devices that manage the VPN;
   identifying actual or potential IP address conflicts between the at least two remote endpoint devices, wherein the identifying actual or potential IP address conflicts comprises:
      extracting VPN configuration information and a route table; and
      using the VPN configuration information and the route table to expand and normalize a set of network entries, wherein the expanding and normalizing the set of network entries comprises:
         categorizing the input as host, range, or network and expands;
         converting the set of network entries to decimal;
         performing an iterative compare; and
      providing an output identifying whether a host matches an existing reservation for a host or is included in a network reservation, and also identifies whether an input range or network is a full or partial network reservation match; and
   resolving, preemptively, the actual or potential IP address conflicts independent of an instruction to communicate data from the one or more local peer devices to any of the at least two remote endpoint devices.

2. The method of claim 1, wherein the route table is extracted from a router directing traffic to an appropriate VPN host among a plurality of hosting VPNs, and wherein the identifying actual or potential IP address conflicts comprises generating a sorted list with host/network address, subnet mask, and associated VPN information, and wherein the VPN configuration information is extracted from a set of applicable routers.

3. The method of claim 1, wherein extracting the route table includes extracting filters on Request for Comment (RFC) 1918 addresses.

4. The method of claim 1, wherein extracting the configuration information is performed by a computer storing the configuration information within an address space local to the computer.

5. The method of claim 1, wherein the VPN is an Internet Protocol security (IPSEC) paradigm VPN.

6. The method of claim 1, further comprising:
   communicating data to an endpoint device via a VPN, the communicating comprising performing network address translation (NAT) to map a conflicting Request for Comments (RFC) 1918 IP address of the endpoint device to a correct remote peer device in the VPN.

7. A computer program product for managing actual or potential internet protocol (IP) address conflicts in a virtual private network (VPN), the computer program product comprising one or more non-transitory tangible storage device having program code embodied therewith, the program code executable by one or more processors of one or more computers to perform a method, the method comprising:
   identifying, by the one or more processors, IP addresses and reserved IP address ranges of at least two remote endpoint devices in the VPN, wherein the at least two remote endpoint devices are connected, via one or more VPN tunnels and via one or more local peer devices or one or more remote peer devices, to one or more local devices that manage the VPN;
   identifying, by the one or more processors, actual or potential IP address conflicts between the at least two remote endpoint devices, wherein the identifying actual or potential IP address conflicts comprises:
      extracting VPN configuration information and a route table; and using the VPN configuration information and the route table to expand and normalize a set of network entries, wherein the expanding and normalizing the set of network entries comprises:
    categorizing the input as host, range, or network and expands;
    converting the set of network entries to decimal;
    performing an iterative compare; and
    providing an output identifying whether a host matches an existing reservation for a host or is included in a network reservation, and also identifies whether an input range or network is a full or partial network reservation match; and
resolving, preemptively, by the one or more processors, the actual or potential IP address conflicts independent of an instruction to communicate data from the one or more local peer devices to any of the at least two remote endpoint devices.

8. The computer program product of claim 7, wherein the route table is extracted from a router directing traffic to an appropriate VPN host among a plurality of hosting VPNs, and wherein the identifying actual or potential IP address conflicts comprises generating a sorted list with host/network address, subnet mask, and associated VPN information, and wherein the VPN configuration information is extracted from a set of applicable routers.

9. The computer program product of claim 7, wherein extracting the route table includes extracting filters on Request for Comment (RFC) 1918 addresses.

10. The computer program product of claim 7, wherein extracting the configuration information is performed by a computer storing the configuration information within an address space local to the computer.

11. The computer program product of claim 7, wherein the VPN is an Internet Protocol security (IPSEC) paradigm VPN.

12. The compute program product of claim 7, wherein the programming instructions further comprise instructions for:
    communicating data to an endpoint device via a VPN, the communicating comprising performing network address translation (NAT) to map a conflicting Request for Comments (RFC) 1918 IP address of the endpoint device to a correct remote peer device in the VPN.

13. A computer system for managing actual or potential internet protocol (IP) address conflicts in a virtual private network (VPN) comprising:
    one or more computer devices each having one or more processors and one or more tangible storage devices; and
    a program embodied on at least one of the one or more storage devices, the program having a plurality of program instructions for execution by the one or more processors, the program instructions comprising instructions for:
        identifying IP addresses and reserved IP address ranges of at least two remote endpoint devices in the VPN, wherein the at least two remote endpoint devices are connected, via one or more VPN tunnels and via one or more local peer devices or one or more remote peer devices, to one or more local devices that manage the VPN;
        identifying actual or potential IP address conflicts between the at least two remote endpoint devices, wherein the identifying actual or potential IP address conflicts comprises:
            extracting VPN configuration information and a route table; and
            using the VPN configuration information and the route table to expand and normalize a set of network entries, wherein the expanding and normalizing the set of network entries comprises:
                categorizing the input as host, range, or network and expands;
                converting the set of network entries to decimal;
                performing an iterative compare; and
                providing an output identifying whether a host matches an existing reservation for a host or is included in a network reservation, and also identifies whether an input range or network is a full or partial network reservation match; and
        resolving, preemptively, the actual or potential IP address conflicts independent of an instruction to communicate data from the one or more local peer devices to any of the at least two remote endpoint devices.

14. The computer system of claim 13, wherein the route table is extracted from a router directing traffic to an appropriate VPN host among a plurality of hosting VPNs, and wherein the identifying actual or potential IP address conflicts comprises generating a sorted list with host/network address, subnet mask, and associated VPN information, and wherein the VPN configuration information is extracted from a set of applicable routers.

15. The computer system of claim 13, wherein extracting the route table includes extracting filters on Request for Comment (RFC) 1918 addresses.

16. The computer system of claim 13, wherein extracting the configuration information is performed by a computer, in the computer system, storing the configuration information within an address space local to the computer.

17. The computer system of claim 13, wherein the VPN is an Internet Protocol security (IPSEC) paradigm VPN.

18. The computer system of claim 13, wherein the programming instructions further comprise instructions for:
    communicating data to an endpoint device via a VPN, the communicating comprising performing network address translation (NAT) to map a conflicting Request for Comments (RFC) 1918 IP address of the endpoint device to a correct remote peer device in the VPN.

\* \* \* \* \*